No. 651,046. Patented June 5, 1900.
C. H. LEGGETT.
SPRAYER.
(Application filed Nov. 3, 1899.)
(No Model.)

WITNESSES:
Thomas F. Wallace
Rene Bruine

INVENTOR:
Clinton H. Leggett
By his Attorneys,

THE NORRIS PETERS CO., PHOTO-LITHO., WASHINGTON, D. C.

UNITED STATES PATENT OFFICE.

CLINTON H. LEGGETT, OF NEW YORK, N. Y.

SPRAYER.

SPECIFICATION forming part of Letters Patent No. 651,046, dated June 5, 1900.

Application filed November 3, 1899. Serial No. 735,676. (No model.)

*To all whom it may concern:*

Be it known that I, CLINTON H. LEGGETT, a citizen of the United States, and a resident of the borough of Manhattan, in the city, county, and State of New York, have invented certain new and useful Improvements in Sprayers, of which the following is a specification.

This invention relates to sprayers, and aims to provide certain improvements therein. Many devices for spraying plants and animals with poisons, either in dry-powder form or in solution, have been produced, and means for spraying a mixture of kerosene and water have been employed for like purposes, a can of kerosene being usually submerged in a barrel of water mounted on and adapted to be transported in a wagon being the most common method of spraying kerosene, a force-pump and an atomizer being used to effect the spraying. My present invention aims to provide an improved sprayer especially adapted to atomizing kerosene and applying it in an aqueous spray on plants and animals. To this end in carrying out my improvements I provide a hand-operated and manually-transportable spraying device which combines a pump, kerosene-holder, and water-reservoir and atomizing means, and means for regulating the proportion of kerosene to be discharged with the aqueous spray, and I provide a number of features of structural improvement in the construction, arrangement, and operation of the improved device, all of which will be hereinafter fully set forth.

Figure 1:
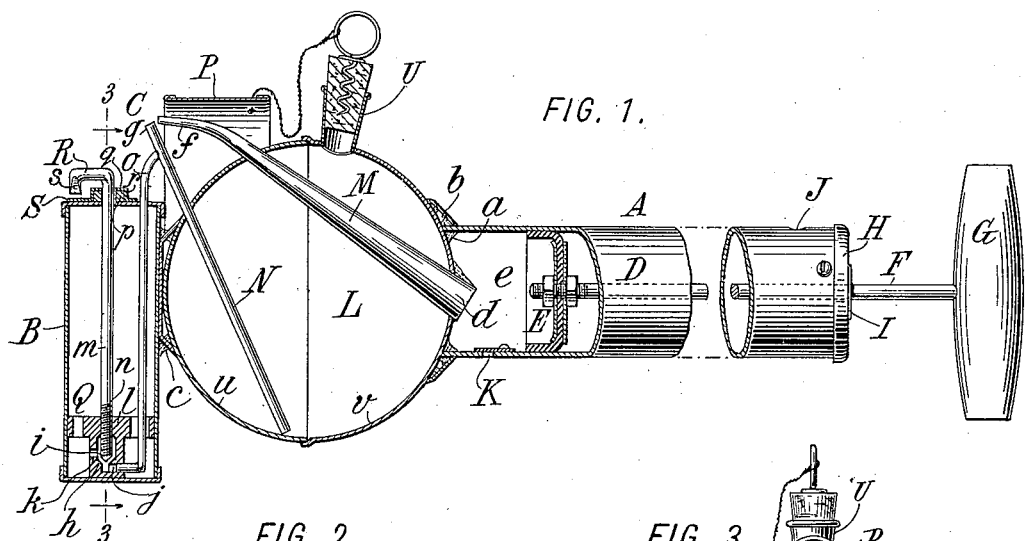
Figure 2:
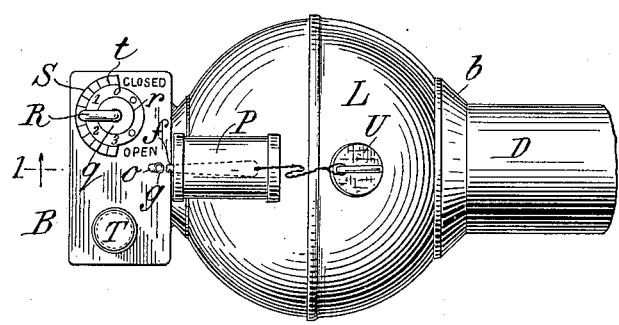
Figure 3:
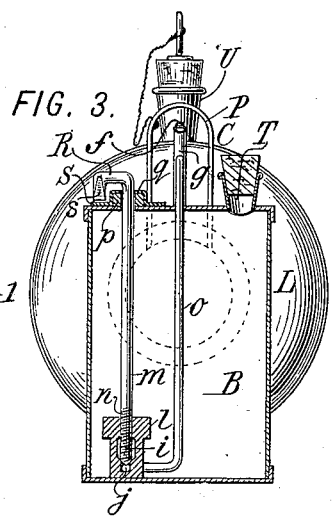
Figure 4:
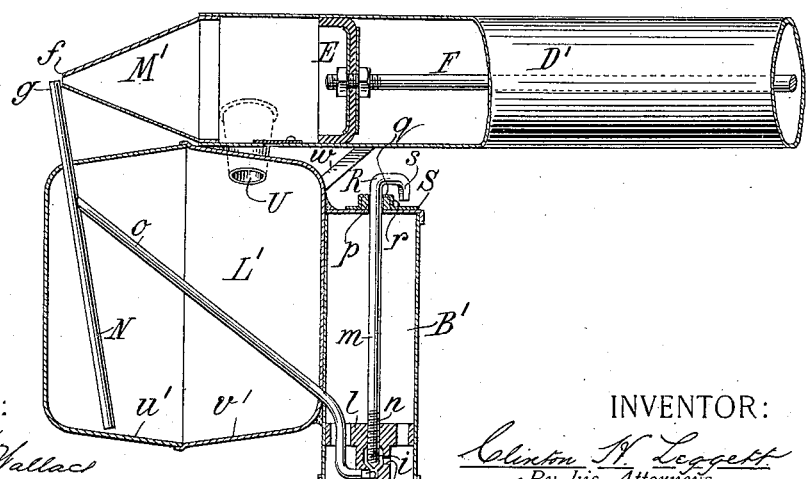

In the accompanying drawings, which illustrate certain modifications of my invention, Figure 1 is a fragmentary side elevation, partly in axial mid-section, showing the preferred form of my improved sprayer cut on the line 1 1, Fig. 2. Fig. 2 is a fragmentary plan view thereof. Fig. 3 is a fragmentary front elevation thereof, partly in transverse vertical section, on the line 3 3 of Fig. 1; and Fig. 4 is a fragmentary side elevation, partly in vertical longitudinal section, showing a modified form of the apparatus.

Referring to the drawings, A represents an air-pump, B an oil-reservoir, and C an atomizer. The pump A may be any suitable force-pump, but is preferably formed with a cylinder D, within which is a cupped leather piston E, operated by a rod F through the medium of a handle G, which rod is guided in the head H of the cylinder and is arrested by a stop I on the rod striking the head, so that the piston shall be stopped at a predetermined point in its movement.

J is a relief-aperture communicating with the pump-chamber in the cylinder at the rear of the piston, and K is an inlet-valve in front of the piston. The oil-reservoir may be any suitable vessel for holding kerosene or a suitable emulsion of which it is a constituent or any other liquid or material which it is desired to spray.

According to one feature of improvement I provide a liquid-tank L in connection with the sprayer C, using an air-pump and an air-nozzle M, leading therefrom to the atomizer, and drawing up water from the tank L and oil from the reservoir B, so that they will be commingled and mixed and ejected by an air-blast instead of by utilizing the water-current as the ejection-blast, as has heretofore been done. Using the air-blast insures a forceful current and a finer subdivision of the spray and greatly reduces the amount of water necessary to be transported by the sprayer, since only that is used which it is desired to commingle with the oil or serving as the medium for projecting the spray. This also obtains a greater lightness of the spray and enables the application of a finer coating or film than could be done with previous spraying apparatus.

According to another feature of improvement I interpose the water-tank L between the air-pump and the reservoir B. The water-tank is preferably spherical or bulbous-shaped, and when spherical its convex exterior is fitted into the open end *a* of the cylinder D and soldered thereto or otherwise suitably united, as by a reinforce *b*, which is a ring surrounding the cylinder and embracing the sphere, so that a very strong joint is effected and the axes of the cylinder and tank are in alinement. The reservoir is placed on the diametrically-opposite side of the tank in the construction shown in Fig. 1, another reinforce *c* being soldered to the tank and to the reservoir, the flat rear wall of the reservoir lying against the convex wall of the tank and the reinforce affording a large bearing-surface on each for insuring their firm connection. The reservoir is preferably oblong in cross-section and depends somewhat below the tank. The water-pipe N of the atomizer rises from the bottom of the tank at an angle and the oil-pipe O from the reservoir rises from its bottom and enters the water-pipe near the outer end thereof. The air-pipe M from the pump extends through the reservoir and terminates near the outer end of the water-pipe N. The protecting-hood P covers the atomizer. The air-pipe M has a large inlet $d$, opening in the air-chamber $e$ of the pump, and a contracted discharge-nozzle $f$, projecting a jet of air forwardly in a direction approximately parallel with the axis of the pump. The water and oil pipes join at a point outside of the tank and reservoir, and the water-pipe is inclined forwardly, so that its upper end $g$ is at an oblique angle to the direction of the air-jet, inclining slightly toward the direction of such jet. The air from the jet blowing across the end of the water-pipe draws up water and oil by suction and sprays the mixture in fine atoms, which are blown forwardly with the stream of air during the instroke of the pump-piston. During the back stroke of this piston the valve K permits air to flow into the pump-cylinder, and the contracted end $f$ of the air-pipe reduces the tendency to backflow through that pipe to such extent that there is practically no danger of drawing back any of the liquid into the air-pipe. The forward inclination of the water-pipe is an additional safeguard against such back draft, since any reverse current of air toward the jet $f$ tends to force a backflow down the water-pipe rather than to cause an ejecting suction at the outer end of such pipe.

Another feature of improvement provides simple means for regulating the proportion of oil fed out with the water. To accomplish this, I prefer to use a valve Q in the bottom of the reservoir B, a regulator R for adjusting this valve, and an indicator for showing its adjustment. The valve preferably has an annular seat $h$ and a valve proper, $i$. The egress-passage $j$ from the valve is in communication with the pipe O, and the inlet-passage $k$ opens into the reservoir near its bottom. A casing $l$ carries the valve-seat, and a rod $m$ carries the valve proper on its lower end and has a screw-thread $n$ screwing into the casing, so that by turning the rod the valve proper may be adjusted toward and from the seat. The rod $m$ rises through the top of the reservoir, where a comparatively-tight joint around it is effected by a packing-washer $p$, which is held in a socket $q$ in the under side of a plate $r$, fixed to the top of the reservoir. The regulator R is shown as a laterally-bent portion of the rod $m$, constituting a handle by which the rod may be turned to screw the valve proper toward or from the seat. The indicator S consists of a pointer $s$, formed as a downturned end of the rod, and a scale $t$ opposite the pointer and formed on the plate $r$. Turning the pointer to the graduation marked "0" will close the valve, and turning it to the opposite extremity of the graduations will fully open the valve.

T is a stoppered inlet for the reservoir, and U is a stoppered inlet for the tank. The tank preferably consists of two hemispherical segments $u$ and $v$, overlapping at their edges and there fixed together with a leak-tight joint.

In use the tank is filled with water and the reservoir filled with oil, emulsion, or other liquid or solution which it is desired to dilute and spray. The valve $i$ is adjusted to give the desired feed from the reservoir, and the user grasps the pump-cylinder D with one hand and the pump-handle G with the other and reciprocates the handle with one hand, while holding and transporting the sprayer and directing its stream of spray with the other hand by simply grasping the cylinder, which thus serves as a handle for the device.

It will be seen that my invention provides a simple, cheap, strong, and compact sprayer which can be readily transported and easily used manually by any individual and by which a very delicate and thin spray may be applied.

It will be understood that my invention is not limited to the exact details of construction and arrangement set forth as constituting its preferred form, since it can be modified, as circumstances or the judgment of those skilled in the art may dictate, without departing from the spirit of the invention. One modification is shown in Fig. 4, in which the pump-cylinder D' is soldered to the top of the tank L', the air-pipe M' constituting the front wall of the cylinder and the oil-reservoir B' being fixed to the rear wall of the tank. The tank in this case consists of two cup-shaped members $u'$ and $v'$, having flat front and rear walls, and the reservoir is soldered to the rear wall of the member $v'$ underneath the pump. The water-pipe N and oil-pipe O are here joined inside the tank, and a brace $w$ is provided between the bottom of the pump and the rear part of the tank. In other respects this construction is similar to that before described and bears the same letters of reference.

What I claim is—

1. In sprayers, the combination with an air-pump, a water-tank, an oil-reservoir, an air-pipe leading from the pump and ducts leading from the water-tank and the oil-reservoir and discharging opposite said air-pipe, of a valve in said reservoir for controlling the outflow of oil therefrom, and a regulator for said valve.

2. In sprayers, the combination with an air-pump, a water-tank, an oil-reservoir, an air-pipe leading from the pump and ducts leading from the water-tank and the oil-reservoir and discharging opposite said air-pipe, of a valve in said reservoir for controlling the outflow of oil therefrom, and an indicator showing the position of said valve.

3. The combination with a pump adapted to be held in the hand, of a water-tank fixed on the end of the pump, supported thereby, and closing the end thereof, an oil-reservoir supported on said water-tank, an atomizer for mixing and atomizing oil and water, and ducts leading from said tank and reservoir to said atomizer.

4. The combination with a cylindrical pump adapted to be held in the hand and having an open end, of a tank having a spherical body fixed to, with its convex exterior partially entering, and closing the end of said pump, an atomizer; and ducts leading from said tank and pump to said atomizer.

5. The combination with a pump, of a water-tank fixed across the front end thereof and in line therewith, and an oil-reservoir fixed on the front side of the water-tank, an atomizer for mixing and spraying water and oil, and ducts leading from said tank and reservoir to said atomizer.

In witness whereof I have hereunto signed my name in the presence of two subscribing witnesses.

CLINTON H. LEGGETT.

Witnesses:
THOMAS F. WALLACE,
FRED WHITE.